United States Patent [19]

Iwai

[11] Patent Number: 4,637,486
[45] Date of Patent: Jan. 20, 1987

[54] AIR INTAKE SYSTEM AND COOLING SYSTEM RELATION FOR THREE-WHEELED MOTOR VEHICLE WITH RIDING SADDLE

[75] Inventor: Kazuhiro Iwai, Saitama, Japan

[73] Assignee: Honda Giken Kogyo Kabushiki Kaisha, Tokyo, Japan

[21] Appl. No.: 772,091

[22] Filed: Sep. 3, 1985

[30] Foreign Application Priority Data

Sep. 3, 1984 [JP] Japan ................. 59-184068

[51] Int. Cl.4 ............. B60K 13/02; B62D 61/08
[52] U.S. Cl. ........................... 180/225; 55/385 B;
180/68.1; 180/210; 180/215; 180/229
[58] Field of Search ............. 180/225, 219, 215, 68.1, 180/68.2, 68.4, 68.6, 229, 210; 280/282; 55/385 B

[56] References Cited

U.S. PATENT DOCUMENTS

| 4,321,978 | 3/1982 | Tominaga et al. | 180/225 |
| 4,428,451 | 1/1984 | Yamaoka | 180/229 |
| 4,445,587 | 5/1984 | Hillman | 180/229 |
| 4,484,651 | 11/1984 | Hattori et al. | 180/225 |
| 4,531,606 | 7/1985 | Watanabe | 180/215 X |
| 4,549,762 | 10/1985 | Burk et al. | 180/68.1 X |
| 4,597,466 | 7/1986 | Yamada | 180/225 |

FOREIGN PATENT DOCUMENTS 51-3733 6/1974 Japan ................. 180/68.1

Primary Examiner—John J. Love
Assistant Examiner—Mitchell J. Hill
Attorney, Agent, or Firm—Armstrong, Nikaido, Marmelstein & Kubovcik

[57] ABSTRACT

A motor vehicle with a riding saddle has a frame including a main pipe employed as an air intake passage for supplying air to an air cleaner. The main pipe has an air inlet defined in its front end. An air guide member is disposed on one side of the main pipe for introducing external air into the air inlet, and a radiator for cooling a water-cooled engine is disposed on the other side of the main pipe.

5 Claims, 4 Drawing Figures

AIR INTAKE SYSTEM AND COOLING SYSTEM RELATION FOR THREE-WHEELED MOTOR VEHICLE WITH RIDING SADDLE

BACKGROUND OF THE INVENTION

The present invention relates to a motor vehicle with a riding saddle, such as a two-wheeled or three-wheeled motorcycle for example, the motor cycle having a frame including a main pipe which is employed as an air intake passage.

One motor vehicle with a riding saddle such as a two-wheeled or three-wheeled motorcycle has a frame including a head pipe, a main pipe, and a down pipe, the main and down pipes extending rearwardly from the head pipe. The head pipe, the main pipe, and the down pipe are interconnected at a front end of the frame, with a gusset welded to the front frame end and surrounding a space. An air intake port is defined in the front portion of the main pipe and opens in the space surrounded by the gusset. The gusset has an air inlet defined in a side thereof surrounded by an air guide member opening in the forward direction. The main pipe has a rear portion connected to an air cleaner in communication therewith. External air is introduced through the air guide member, the air inlet, and the air intake port into the main pipe, and supplied through the main pipe to the air cleaner. The air supplied to the air cleaner is then fed therefrom through a connecting tube to a carburetor. Such an air intake structure is disclosed in a U.S. patent application filed on Feb. 5, 1985 and assigned to the same assignee as that of the present patent application.

The aforesaid said intake structure allows external air to be supplied smoothly to the air cleaner, with the main pipe being used as a member for introducing external air.

Where a water-cooled engine is mounted on the motor vehicle of the type described above, it is necessary to install a radiator in an optimum position which meets various conditions. In the foregoing U.S. patent application, the radiator is disposed directly below a fuel tank placed on the main pipe, making the fuel tank small in fuel storage capacity and imposing limitations on the design freedom to change the position of the radiator.

SUMMARY OF THE INVENTION

Accordingly, it is an object of the present invention to provide a motor vehicle with a riding saddle and a water-cooled engine, the motor vehicle having a frame including a main pipe used as an air intake passage and a radiator attached in an appropriate position for increasing the air intake efficiency and cooling efficiency of the water-cooled engine without reducing the fuel storage capacity of a fuel tank.

Another object of the present invention is to provide a motor vehicle with a riding saddle and a water-cooled engine, the motor vehicle including a radiator which can relatively freely be changed in its position of installation.

According to the present invention, the above objects can be accomplished by a motor vehicle with a riding saddle, comprising a head pipe, a main pipe extending rearwardly from the head pipe and having a hollow passage therethrough, the main pipe having air inlet and outlet means on front and rear ends thereof for supplying air into and discharging air from the the hollow passage, an air cleaner connected to the air outlet means, an air guide member disposed on one side of the front end of the main pipe for introducing external air into the air inlet means, a water-cooled engine, and a radiator disposed on an opposite side of the front end of the main pipe for cooling said water-cooled engine.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
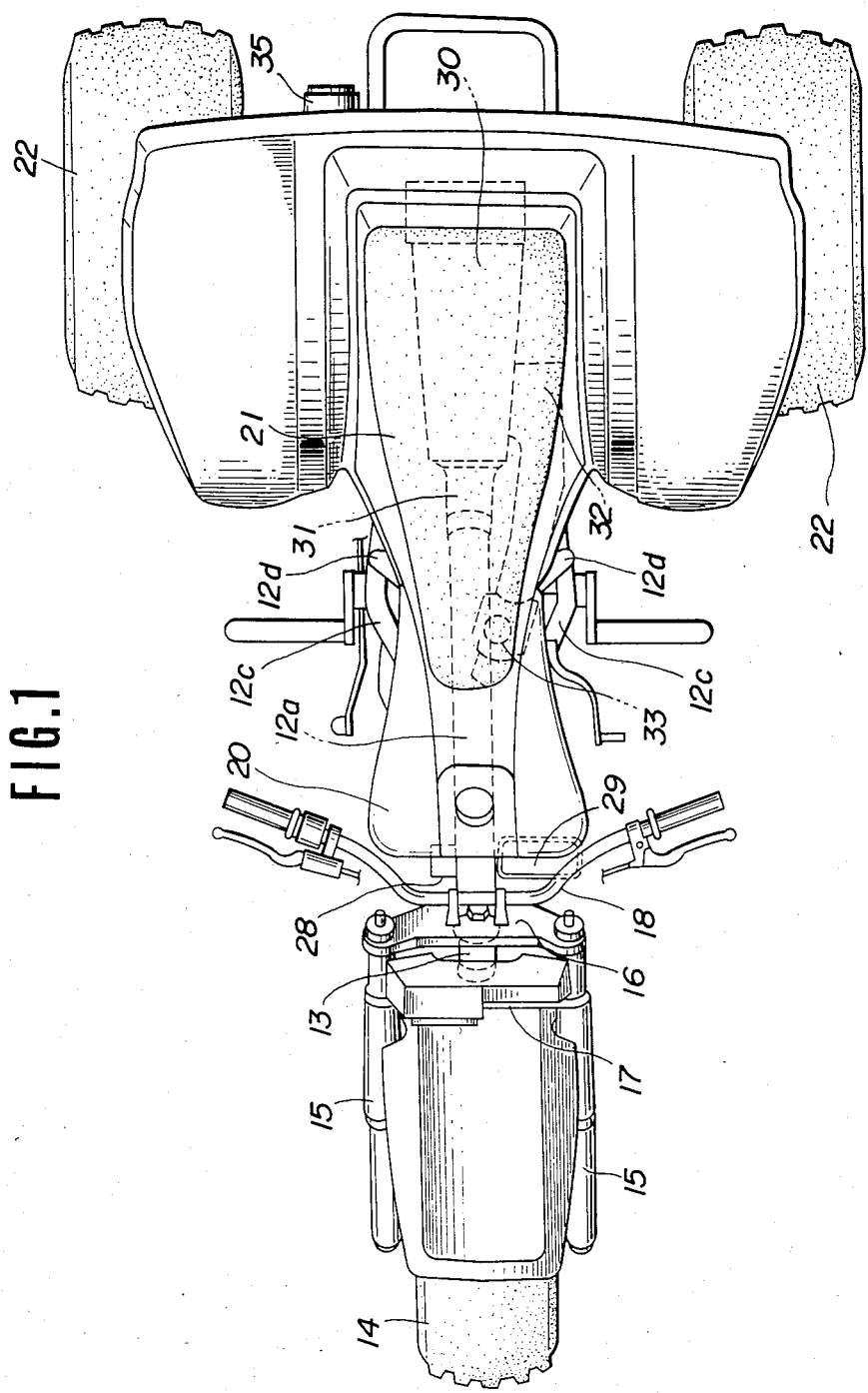
FIG. 1 is a plan view of a buggy-type three-wheeled motorcycle as one example of a motor vehicle with a riding saddle according to a first embodiment of the present invention.
Figure 2:
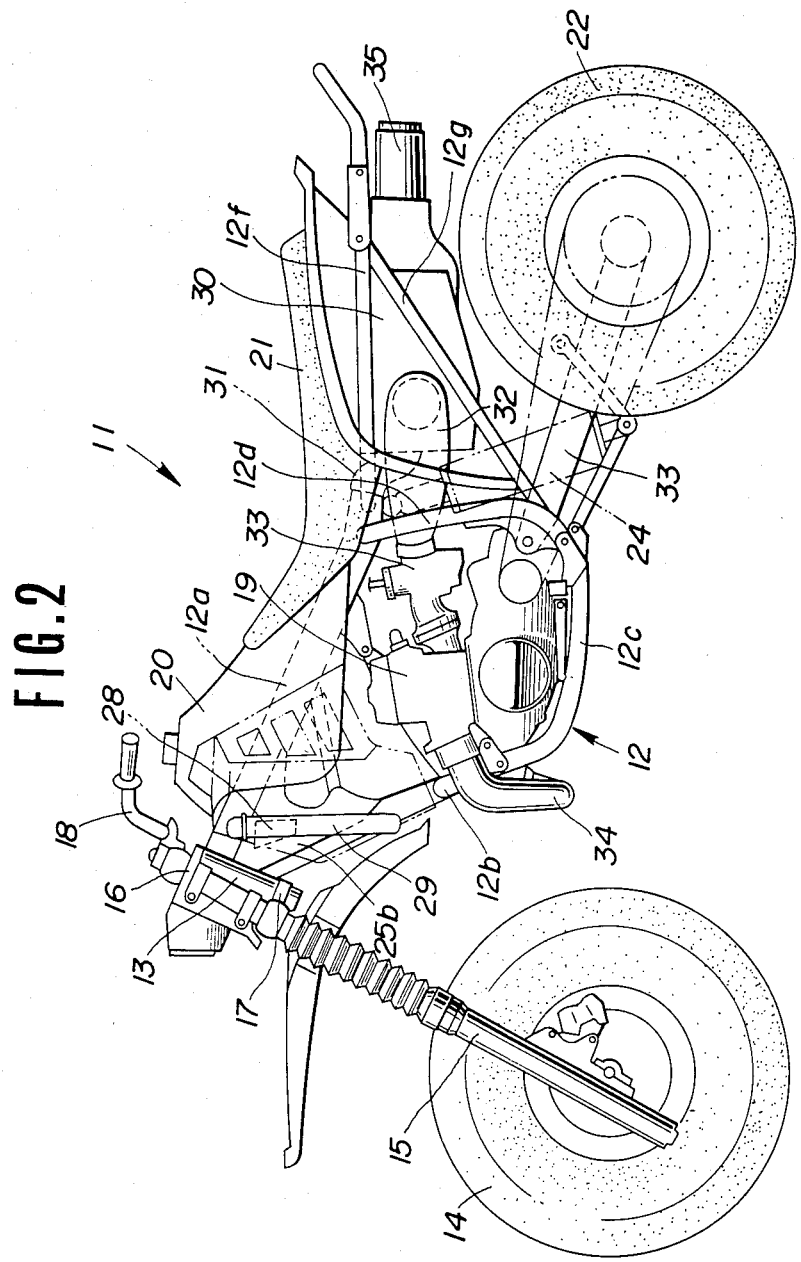
FIG. 2 is a side elevational view of the three-wheeled motorcycle shown in FIG. 1.

As shown in FIGS. 1 and 2, a buggy-type three-wheeled motorcycle 11 according to a first embodiment of the present invention has a frame 12 including a head pipe 13 on its front end. A front fork 15 supporting a front wheel 14 is steerably supported on the head pipe 13 by upper and lower bridges 16, 17. A steering handle 28 is connected to the front fork 15 above the upper bridge 16.

The frame 12 is composed of a hollow main pipe 12a extending rearwardly from the upper end of the head pipe 13, a down pipe 12b extending downwardly from the lower end of the head pipe 13, a pair of laterally spaced lower pipes 12c extending rearwardly from the lower end of the down pipe 12b, and a pair of laterally spaced central pipes 12d extending upwardly from the rear ends of the lower pipes 12c, respectively, and joined to the rear end of the main pipe 12a. The main pipe 12a, the down pipe 12b, the lower pipes 12c, and the central pipes 12d jointly surround a space in which a water-cooled engine 19 is installed. A tension pipe 12e disposed in front of the engine 19 extends between the main pipe 12a and the down pipe 12b. A fuel tank 20 is fixedly mounted on the main pipe 12a above the engine 19.

A pair of laterally spaced seat pipes 12f extend as seat rails rearwardly from the upper ends of the central pipes 12d. A driver's seat 21 in the form of a saddle is placed on the seat pipes 12f. Rear pipes 12g extend between substantially central portions of the seat pipes 12f and the lower portions of the central pipes 12d. From the lower portions of the central pipes 12d, there extends a swing-arm rear fork 23 supporting on its rear end a pair of laterally spaced rear wheels 22, 22 serving as drive wheels. A rear cushioning unit 24 is disposed between the rear fork 23 and the rear end of the main pipe 12a. The rear cushioning unit 24 has a lower end coupled to the rear fork 23 through a link mechanism having progressive characteristics.

Figure 3:
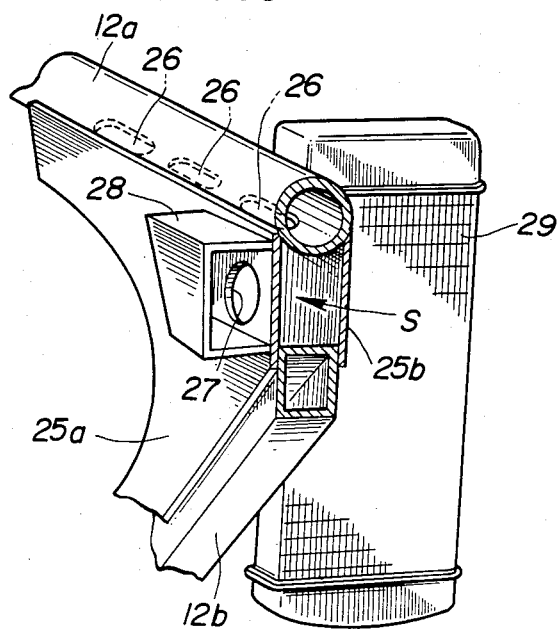
FIG. 3 is fragmentary perspective view, partly cut away, of a portion of the three-wheeled motorcycle of FIG. 1.

The front ends of the head pipe 13 and the main pipe 12a and the upper end of the down pipe 12b are joined together by a pair of laterally spaced gusset plates 25a, 25b (FIG. 3) with their rear ends connected to each other to close off the rear end of a space S defined jointly by the main pipe 12a, the down pipe 12b, the head pipe 13, and the gusset plates 25a, 25b, as shown in FIG. 3. The front end of the space S is substantially closed by the head pipe 13.

The main pipe 12a has a plurality of air intake ports 26 defined in the substantially lower surface of the front end portion thereof and opening into the space S. The gusset plate 25a has an air inlet 27 covered with a box-shaped air guide member 28 coupled to the gusset plate 25a and opening in the forward direction of the motorcycle 11. The air guide member 28 may be semicylindrical in shape.

A radiator 29 is disposed laterally of the gusset plate 25b or in a space in front of the fuel tank 20 on one side of the main pipe 12a opposite to the air guide member 28. The radiator 29 has an upper end supported by the main pipe 12a and a lower end supported by the down pipe 12b.

Turning back to FIGS. 1 and 2, an air cleaner case 30 is positioned in a space surrounded by the seat pipes 12f and the rear pipes 12g downwardly of the driver's seat 21. The air cleaner case 30 has an air inlet opening defined in the front portion thereof and connected by a connecting tube 31 to the opening in the rear end of the main pipe 12a to provide communication between the air clearner case 30 and the main pipe 12a. The air cleaner case 30 also has an air outlet opening defined in a lefthand side thereof (FIG. 1) and held in communication with a carburetor 33 through a connecting tube 32. The carburetor 33 is located behind the engine 19. An exhaust pipe 34 extending from the engine 19 is connected to a muffler 35 disposed on the righthand side of the air cleaner case 30.

External air flowing to the left (FIGS. 1 and 2) in the longitudinal direction of the motorcycle 11 is introduced through the air guide member 28 and the air inlet 27 into the space S between the gusset plates 25a, 25b. The introduced air then flows through the air intake ports 26 into the main pipe 12a, from which the air is supplied through the connecting tube 31 to the air cleaner case 30. After having been cleaned by the air cleaner case 30, the air is passed through the connecting tube 32 into the carburetor 33. The air is then mixed with fuel by the carburetor 33, and the air-fuel mixture is supplied to the engine 19.

Cooling water which is heated by cooling the engine 19 is supplied to and cooled by the radiator 29.

Figure 4:
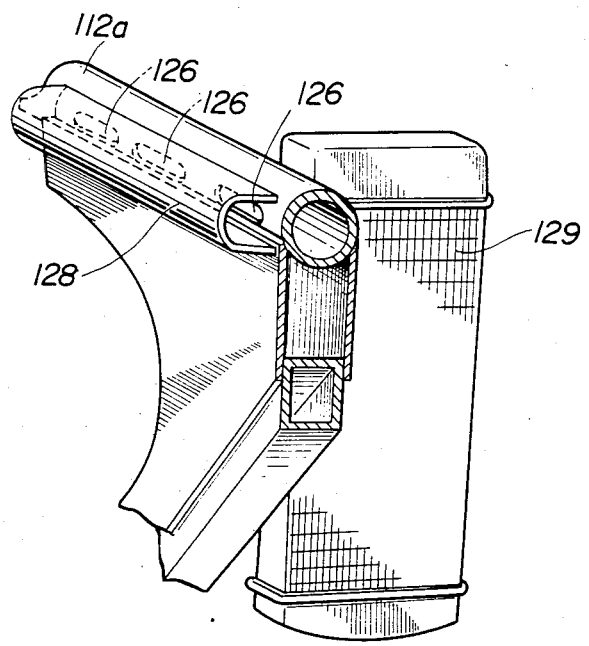
FIG. 4 is a view similar to FIG. 3, showing a second embodiment of the present invention.

FIG. 4 shows a second embodiment of the present invention. A main pipe 112a has a plurality of air intake ports 126 defined in one lateral surface thereof and serving as air inlets. The air intake ports 126 are covered with an air guide member 128 attached to one side of the main pipe 112a and opening in the forward direction of the motorcycle. A radiator 129 is disposed on the opposite side of the main pipe 112a.

With the arrangement of the present invention, a motor vehicle has a frame including a main pipe employed as an air intake passage and also has a water-cooled engine. An air guide member is mounted on one side of the front end portion of the main pipe for introducing external air into the main pipe, and a radiator is disposed on the other side of the main pipe. The air intake efficiency and the engine cooling efficiency can be increased without reducing the fuel storage capacity of the fuel tank. The position of installation of the radiator can relatively freely be changed in the longitudinal direction of the frame.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A three-wheeled vehicle with a riding saddle comprising:
    a frame including
    a head pipe, and
    a main pipe extending rearwardly from said head pipe and having a hollow passage therethrough;
    said main pipe having air inlet and outlet means on front and rear ends thereof for supplying air into and discharging air from the said hollow passage;
    one front wheel and two rear wheels mounted on said frame;
    a seat disposed on said main pipe;
    an air cleaner connected to said air outlet means below said seat;
    an air guide member disposed on one side of said front end of said main pipe for introducing external air into said air inlet means, said air guide member extending in a longitudinal direction of said vehicle;
    a water-cooled engine mounted on said frame; and
    a radiator disposed on an opposite side of said front end of said main pipe and connected for cooling said water-cooled engine.

2. A motor vehicle according to claim 1, wherein said air inlet means comprises at least one air intake port defined in a substantially lower surface of said main pipe, and an air inlet opening laterally of the motor vehicle and held in communication with said air intake port through a substantially closed space.

3. A motor vehicle according to claim 2, wherein said air guide member is open in the forward direction of the motor vehicle, said air inlet being covered with said air guide member.

4. A motor vehicle according to claim 1, wherein said air inlet means comprises an air inlet defined in substantially one lateral surface of said main pipe.

5. A motor vehicle according to claim 4, wherein said air guide member is open in the forward direction of the motor vehicle, said air inlet being covered with said air guide member.

* * * * *